3,660,391
2-METHYL - 3 - CARBOXYLIC ACID AMIDO-QUINOXALINE-1,4-DI-N-OZIDES AND THEIR PRODUCTION

Kurt Ley, Odenthal-Globusch, Ulrich Eholzer, Cologne-Stammheim, Roland Nast, Cologne-Buchheim, Karl Georg Metzger, Wuppertal-Elberfeld, and Dieter Fritsche, Wuppertal-Vohwinkel, Germany, assignors to Farbenfabriken Bayer Aktiengesellschaft, Leverkusen, Germany No Drawing. Filed Oct. 2, 1968, Ser. No. 764,611
Claims priority, application Germany, Oct. 4, 1967, F 53,665
Int. Cl. C07d 51/78
U.S. Cl. 260—247.5 R                  20 Claims

ABSTRACT OF THE DISCLOSURE 2-methyl-3-carboxylic acid-amido-quinoxaline - 1,4-di-N-oxides of the formula:

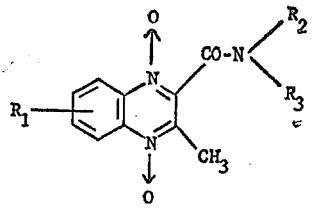

wherein:

$R_1$ is hydrogen, lower alkyl, lower alkoxy or chlorine,
$R_2$ is hydrogen, straight or branched chain alkyl or straight or branched chain alkyl substituted by hydroxy, lower alkoxy, carbalkoxy, monoalkylamino or dialkylamino, and
$R_3$ is hydrogen, straight or branched chain alkyl, straight or branched chain alkyl substituted by hydroxy, lower alkoxy, carbalkoxy, monoalkylamino or dialkylamino, or when $R_2$ is hydrogen, cyclohexyl, or $R_2$ and $R_3$ together with the amide nitrogen atom form part of a 5- or 6-membered heterocyclic ring, are useful for their antibacterial effect. These compounds may be produced, inter alia, by reacting a benzofuroxan of the formula:

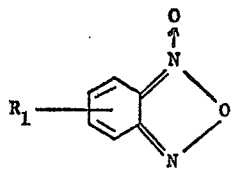

with an acetoacetic acid amide of the formula:

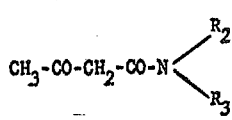

wherein $R_1$, $R_2$ and $R_3$ are as above defined.

---

The present invention is concerned with 2-methyl-3-carboxylic acid-amido-quinoxaline-1,4 - di-N-oxides and their production. More particularly, these compounds can be represented by the formula:

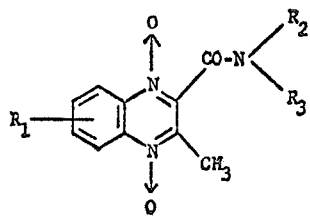

wherein:

$R_1$ is hydrogen, lower alkyl, lower alkoxy or chlorine,
$R_2$ is hydrogen, straight or branch chained alkyl or straight or branched chain alkyl substituted by hydroxy, lower alkoxy, carbalkoxy, monoalkylamino or dialkylamino, and
$R_3$ is hydrogen, straight or branched chain alkyl, straight or branched chain alkyl substituted by hydroxy, lower alkoxy, carbalkoxy, monoalkylamino or dialkylamino, or when $R_2$ is hydrogen, cyclohexyl, or $R_2$ and $R_3$ together with the amide nitrogen atom form part of a 5- or 6-membered heterocyclic ring.

These compounds are useful as antibacterial compounds.

The compounds of the present invention may be produced, inter alia, by reacting a benzofuroxan of the formula:

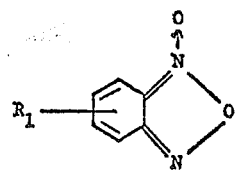

with an acetoacetic acid amide of the formula:

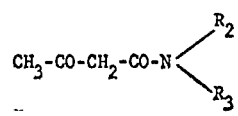

in the presence of ammonia or a primary amine in a suitable organic solvent at a temperature of from about 20° C. to about 100° C.

According to the present invention, the preferred lower alkyl and lower alkoxy groups for $R_1$ are those containing 1 to 4 carbon atoms. When $R_2$ and $R_3$ are alkyl, it is preferred that the alkyl moieties contain 1 to 12 carbon atoms. Particularly preferred embodiments are those wherein the alkyl groups contain from 1 to 6 carbon atoms. When the alkyl moieties of $R_2$ and $R_3$ are substituted by lower alkoxy, carbalkoxy, mono- or dialkylamino moieties, it is preferred that the alkyl portions of those moieties contain from 1 to 4 carbon atoms. In the case of the dialkylamino moieties, each alkyl group is preferred to contain 1 to 4 carbon atoms. Where $R_2$ and $R_3$ together with the amide nitrogen atom form a part of a heterocyclic ring, such a ring may contain, besides the amide nitrogen atom, an additional nitrogen atom or an oxygen heteroatom. When $R_2$ and $R_3$ form a 6-membered ring containing 2 heteroatoms, the second heteroatom is preferably in the para position to the amide nitrogen atom and the hydrogen atom may be substituted on the additional nitrogen atom if nitrogen is the second heteroatom by lower alkyl of 1 to 4 carbon atoms which, in turn, may itself be substituted by hydroxy, methoxy or acetoxy.

If benzofuroxan, β-methoxy-acetoacetic acid amide and ammonia are used as starting materials, the reaction of the invention can be represented by the following reaction mechanism:

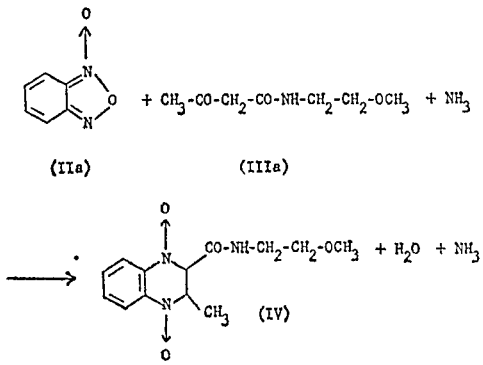

The acetoacetic acid amides of Formula II may be obtained in a manner per se known by reacting amines and diketene.

Examples of acetoacetic acid amides are: acetoacetic acid methylamide, acetoacetic acid dimethylamide, acetoacetic acid ethylamide, acetoacetic acid butylamide, acetoacetic acid-β-hydroxyethylamide, acetoacetic acid-β-methoxy-ethylamide, acetoacetic acid-β-piperazino-ethylamide, acetoacetic acid-N'-β-hydroxy-ethyl-piperazide, acetoacetic acid-morpholide.

Examples of benzofuroxans are benzofuroxan, 5-chloro, 5-methyl, 5-ethyl, 5-propyl, 5-butyl, 5-methoxy, 5-ethoxy-benzofuroxan.

About 1 to about 1.2 moles of an acetoacetic acid amide and about 1 to about 3 moles of ammonia or about 1 to about 3 moles of a primary amine are used per mole of benzofuroxane.

Practically all primary, preferably aliphatic, amines, or ammonia, can be used in the process. Because of the simpler working up and recovery, there are preferably used ammonia or short-chain, inexpensive and water-soluble amines, e.g., methylamine, propylamine, n-butylamine or cyclohexylamine.

Examples of suitable solvents are alcohols (preferably methanol), acetonitrile, dimethyl formamide, dimethyl sulphoxide, tetrahydrofuran, dioxan, benzene, toluene or benzines.

The reaction is carried out in the temperature range of about 20° C. to about 100° C., preferably from about 30° C. to about 60° C.

The process according to the invention is preferably carried out in such a manner that 1 to 1.2 moles of the acetoacetic acid amide (optionally, a solution of amine and diketene obtained in a solvent without intermediate isolation of the acetoacetic acid amide) are suspended or dissolved in a solvent, 1 mole of a benzofuroxan is added and 1 to 3 moles of ammonia or primary amine are introduced.

The reaction is exothermic, and the reaction mixture is kept in the temperature range of 30° C.–60° C. by cooling if necessary and, after subsidence of the reaction heat, taken to completion by heating to 40° C.–100° C. for 1–8 hours if necessary. The starting materials dissolve during the reaction and the appropriate 2-methyl-3-carbonamide-quinoxaline-1,4-di-N-oxide separates in crystalline form and can be isolated in the usual manner and purified.

The new compounds of the invention are crystalline substances, which can be isolated in the usual manner and, if necessary, be purified.

The antibacterial activity of the compounds of the present invention has been demonstrated both in vitro and in vivo and the compounds of the present invention have, in such tests, shown utility upon both subcutaneous as well as oral administration against acute bacterial infections. The compounds are effective against a range of both gram positive and gram negative bacteria.

The general dosage ranges of the compounds of the present invention are from about 5 mg. to about 300 mg. and preferably from about 20 mg. to about 100 mg./kg. per body weight per day. It is, however, to be appreciated that in some cases it may be necessary or desirable to administer a greater or lesser amount, which amount will be dependent upon the type of infection, the severity of the condition, the body weight of the human or animal involved, the past medical history and other factors generally taken into consideration by those administering antibacterial compounds. In the case where larger amounts are administered, it is generally advisable to divide these larger dosages into several smaller doses which may be administered during the course of the day.

The compounds of the present invention may be used either as such or may be administered in combination with known pharmaceutically acceptable carriers and diluents. Suitable as administration forms in combination with various inert carriers and diluents for the compounds of the present invention are tablets, capsules, powders, sprays, elixirs, aqueous suspensions, injectable solutions, syrups and the like. The carriers and diluents also include fillers and sterile aqueous media, as well as non-toxic organic solvents and other suitable pharmaceutical vehicles well known by those in the art. If desired, tablets, capsules or other forms used for oral administration may be provided with a sweetening additive or other suitable flavoring sutsbance. The compounds of the present invention, which is the active ingredient in such a pharmaceutical composition, should be present in a concentration of from about 0.5 to about 90% by weight of the total composition.

For oral administration, tablets may also contain such known additives as sodium citrate, calcium carbonate, dicalcium phosphate, together with various adjuvants such as starch, preferably potato starch, and the like, and binders such as polyvinylpyrrolidine, gelatin and the like, lubricants such as magnesium stearate, sodium lauryl sulphate and talc may also be used for tablet-making. For aqueous suspensions and/or elixirs which are intended for oral administration, suitable substances to improve the taste, dyestuffs, emulsifiers and/or diluents, such as water, ethanol, propylene glycol, glycerol and the like, may be added.

For solutions intended for parenteral application, the compound of the present invention may be combined with sesame oil or arachis oil or aqueous propylene glycol or N,N-dimethyl formamide may be used, as well as sterile aqueous solutions when water soluble compounds are utilized. If necessary, such aqueous solutions can be buffered in known and customary manner and the liquid diluents should be rendered isotonic beforehand by the addition of the requisite amount of salt or glucose. Such aqueous solutions are particularly suitable for intravenous, intramuscular and intraperitoneal injections. Sterile aqueous media may be prepared in manners per se known in the art.

The following data shows the effectiveness of compounds selected as representative of the class as a whole and the number of the compounds tested corresponds to the example number. These tests demonstrate the effectiveness of representative species and the genus as a whole embraces compounds having antibacterial activity already indicated.

In the animal experiments with white mice, the intraperitoneally infected animals were treated subcutaneously or orally as follows:

(1) Administration in one dose, subcutaneously or orally, of 1000 mg., 500 mg., 200 mg., 100 mg., 50 mg., 25 mg., 12.5 mg. or 6.25 mg./kg. 15 minutes before or 90 minutes after infection.

(2) Administration in two (or three) doses of 6.25 mg., 12.5 mg., 25 mg., 50 mg. or 150 mg./kg. two hours before and five hours after infection.

(3) Administration in four doses of 50 mg. or 150 mg./kg. two hours before infection, shortly before infection, 3 hours, 5 hours and/or 21 hours and 29 hours after infection.

The bacteria used for infections were *E. coli*, Klebsiella, *Staphylococcus aureus*, *Diplococcus pneumoniae* or *Streptococcus pyogenes*, *Proteus mirabilis* and *Pseudomonas aeruginosa*. The $ED_{100}$ of the most effective compounds (e.g., 1, 2, 3, 10, 6, 7) against *E. coli* C165 lies, in the case of administration on one dose, orally or subcutaneously, between 5 mg./kg. and 100 mg./kg.

The $DL_{50}$ lies in the dosage range of about 400 mg./kg. to about 1500 mg./kg. after oral administration in one dose to mice. The substances are thus relatively non-toxic since the relatively less well tolerated ones are distinguished by higher effectiveness and are, therefore, applied only in low dosage. Also in the case of treatment of rats with 60 mg./kg. orally twice daily over two weeks, the substances were well tolerated. In the case of acute ascending infections of the urinary tract of the rat (pyclonephritis), dosages of 2× 15 mg./kg. daily, i.e., 15 mg./kg. twice a day, over 7–10 days were applied with success and were tolerated well. In vitro, the substances act bacteriostatically and bactericidally.

The new compounds are also effective against Mycoplasma infections in the in vitro test, amounts of about 5 to about 50γ per ml. being used.

1. ANIMAL EXPERIMENTS WITH WHITE MOUSE

| Substance from Example | Doses (mg./kg.) oral and number of administrations per day | Infection germ: a=*E. coli* C 165 b=*Staph. aureus* 133 c=*Pseudomonas aeruginosa* Walter | Percent surviving animals 24 hours after infection |
|---|---|---|---|
| 1 | 1×6 | a | 100 |
|   | 1×50 | b | 100 |
|   | 4×50 | c | --- |
| 2 | 1×25 | a | 100 |
|   | 1×100 | b | 100 |
|   | 2×150 | c | 40 |
| 3 | 1×25 | a | 100 |
|   | 1×100 | b | 100 |
|   | 4×50 | c | 60 |
| 6 | 1×15 | a | 100 |
|   | 4×50 | b | 90 |
| 7 | 1×25 | a | 100 |
|   | 1×150 | b | 100 |
| 8 | 2×50 | a | 100 |
|   | 4×150 | b | 100 |
| 10 | 1×12 | a | 100 |
|   | 1×50 | b | 100 |
|   | 2×150 | c | 80 |
| 12 | 1×50 | a | 100 |
|   | 1×100 | b | 100 |

2. IN VITRO INHIBITION VALUES

Minimum inhibition concentration in μg./ml. nutrient solution

| Example | *E. coli* | Proteus sp. | Ps. aerug. | Klebs. sp. | Staph. aureus | Streptoc. pyog. |
|---|---|---|---|---|---|---|
| 1 | 10–25 | 10–100 | 50–100 | 10 | 100 | 100 |
| 2 | 10–100 | 6–50 | 150 | 3–100 | 50–100 | 100 |
| 3 | 10–100 | 50 | 100 | 10–100 | 100 | 100 |
| 4 | 20–100 | 100 | >100 | 20–100 | 100 | 100 |
| 5 | 10–100 | 100 | 100 | 10–100 | 100 | 100 |
| 6 | 10 | 10–100 | 100 | 10 | 100 | 100 |
| 7 | 10 | 20 | 100 | 100 | 100 | 100 |
| 8 | 10 | 20 | >100 | 100 | 100 | >100 |
| 10 | 10–100 | 100 | 150 | 100 | 150 | 150 |

The new 2-methyl-3-carboxylic acid amido-quinoxaline-di-N-oxides-(1.4) also show (same general dosage latitude as stated above) effectiveness against amoebae and flagellates (*E. histolytica*, *Trichomonas vaginalis*, *Lamblia muris*) in in vitro as well as in vivo tests on animals (z.B. mice, rats, golden hamsters).

| Example Number | Formula | M.P. in °C. (d=decomp.) | Appearance |
|---|---|---|---|
| 1 | quinoxaline-di-N-oxide, 2-CH₃, 3-CO-NH-CH₃ (4) | 214(d) | Pale-yellow crystals. |
| 2 | quinoxaline-di-N-oxide, 2-CH₃, 3-CO-NH-C₃H₇ (5) | 172 | Do. |
| 3 | quinoxaline-di-N-oxide, 2-CH₃, 3-CO-NH-CH(CH₃)₂ (6) | 208(d) | Do. |
| 4 | quinoxaline-di-N-oxide, 2-CN₃, 3-CO-NH-C₄H₉ (7) | 136 | Do. |

TABLE—Continued

| Example Number | Formula | M.P. in °C. (d=decomp.) | Appearance |
|---|---|---|---|
| 5 | Quinoxaline 1,4-dioxide-2-CO—NH—C(CH₃)₃, 3-CH₃ (8) | 214(d) | Do. |
| 6 | Quinoxaline 1,4-dioxide-2-CO—NH—CH₂—CH₂—OH, 3-CH₃ (9) | 209(d) | Do. |
| 7 | Quinoxaline 1,4-dioxide-2-CO—NH—CH₂—CH₂—OCH₃, 3-CH₃ (10) | 135 | Do. |
| 8 | Quinoxaline 1,4-dioxide-2-CO—NH—(CH₂)₃—OCH₃, 3-CH₃ (11) | 141 | Do. |
| 9 | Quinoxaline 1,4-dioxide-2-CONH—CH₂—CH₂—piperazinyl-NH, 3-CH₃ (12) | 218(Z) | Do. |
| 10 | Quinoxaline 1,4-dioxide-2-CO—N(CH₃)₂, 3-CH₃ (13) | 189 | Do. |
| 11 | Quinoxaline 1,4-dioxide-2-CO—N(C₂H₅)₂, 3-CH₃ (14) | 162 | Do. |
| 12 | Quinoxaline 1,4-dioxide-2-CO-morpholinyl, 3-CH₃ (15) | 231(Z) | Do. |
| 13 | Quinoxaline 1,4-dioxide-2-CO—piperazinyl-N—CH₂—CH₂—OH, 3-CH₃ (16) | 203(Z) | Do. |
| 14 | 6-Cl-Quinoxaline 1,4-dioxide-2-CO—NH—(CH₂)₂—OCH₃, 3-CH₃ (17) | 183 | Yellow crystals. |

TABLE—Continued

| Example Number | Formula | M.P. in °C. (d=decomp.) | Appearance |
|---|---|---|---|
| 15 | (18) quinoxaline di-N-oxide with CO—NH—(CH$_2$)$_2$—OCH$_3$ and 6-CH$_3$, 3-CH$_3$ | 169 | Pink crys |
| 16 | (19) quinoxaline di-N-oxide with CO—NH—(CH$_2$)$_2$—OCH$_3$ and 6-CH$_3$O, 3-CH$_3$ | 190 | Yellow crystals. |
| 17 | (20) quinoxaline di-N-oxide with CO—NH—CH$_3$ and 6-CH$_3$, 3-CH$_3$ | 202 | Do. |
| 18 | (21) quinoxaline di-N-oxide with CO—NH—(CH$_2$)$_3$—N(CH$_3$)$_2$ and 3-CH$_3$ | 154 | Do. |

Into 2 l. of methanol, which are cooled to −10° to 0° C. with Dry Ice, are introduced 380 g. (12 moles) of methylamine; 830 ml. (10 moles) of freshly distilled diketene are then added dropwise at −10° to 0° C., with stirring, the mixture is allowed to come to room temperature and stirring is then continued for 2 hours at 35° C. Into the solution of acetoacetic acid methylamide obtained are added portionwise 1360 g. (10 moles) of benzofuroxane and about 30 moles of ammonia are then introduced, the temperature of the reaction mixture being kept below 45° C. by occasional cooling. After subsidence of the reaction heat, heating to 40–45° C. is effected, followed by stirring for 6–8 hours. The reaction product separates in pale-yellow crystals. Cooling is effected, followed by suction filtration and washing out with methanol. 1709 g. (=73.3% of the theory) of 2-methyl-3-carboxylic acid methylamido - quinoxaline-di-N-oxide-(1.4) are obtained as pale-yellow crystals which, after recrystallisation from dimethyl formamide/methanol, melt at 214° C., with decomposition.

*Analysis.*—C$_{11}$H$_{22}$N$_3$O$_3$ (molecular weight 233); calc. (percent): C=56.7, H=4.73, N=18.03. Found (percent): C=56.9, H=4.8, N=17.9.

The other compounds, that is, those whose formulas are set forth as Examples 2 through 18 are prepared in a similar manner by reacting, respectively:

Benzofuroxan and acetoacetic acid propylamide;
Benzofuroxan and acetoacetic acid isopropylamide;
Benzofuroxan and acetoacetic acid butylamide;
Benzofuroxan and acetoacetic acid tert.-butylamide;
Benzofuroxan and acetoacetic acid hydroxyethylamide;
Benzofuroxan and acetoacetic acid methoxyethylamide;
Benzofuroxan and acetoacetic acid methoxypropylamide;
Benzofuroxan and acetoacetic acid-($\beta$-ethyl-piperazino)-amide
Benzofuroxan and acetoacetic acid dimethylamide;
Benzofuroxan and acetoacetic acid diethylamide;
Benzofuroxan and acetoacetic acid morpholide;
Benzofuroxan and acetoacetic acid p-hydroxyethyl-piperazide;
Chlorobenzofuroxan and acetoacetic acid methoxyethylamide;
Methylbenzofuroxan and acetoacetic acid methoxyethylamide;
Methoxybenzofuroxan and acetoacetic acid methoxyethylamide;
Methylbenzofuroxan and acetoacetic acid methylamide;
Benzofuroxan and acetoacetic acid dimethylaminopropylamide.

The compounds of the present invention may also be produced by oxidizing quinoxalines of the formula:

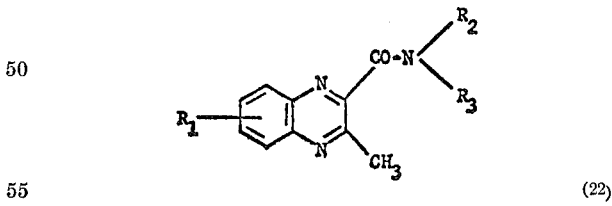

(22)

wherein R$_1$, R$_2$ and R$_3$ are as above defined. Hydrogen peroxide in the presence of glacial acetic acid or acetic anhydride is a preferred oxidizing agent. The oxidation can also be carried out with organic peracids, such as peracetic acid, perbenzoic acid, monoperphthalic acid and the like. When subsequently introducing the N-oxide oxygen, the work is carried out according to known methods (Houben-Weyl "Methoden der organischen Chemie," volume XI/2, page 190 et seq., E. Ochiai, Aromatic Amine-oxides, Elsevier Publishing Co., 1967).

Alternatively, in the preparation of the new compounds it is, if desired, possible to oxidize a quinoxaline of the formula:

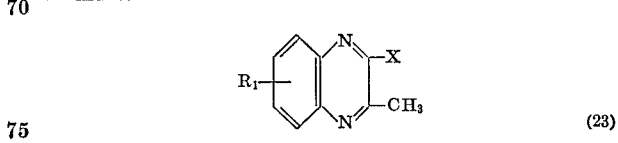

(23)

wherein $R_1$ is as above defined and X is a radical which is readily convertible into a COOH group or $$-CO-N\diagup_{R_3}^{R_2}$$

for example, $CH_3$, $CCl_3$, $CONH_2$ or COHal, $R_2$ and $R_3$ being as above defined, in the aforesaid manner to give the di-N-oxide, and then converting this intermediate into the desired final compound.

In addition to the new compounds and processes disclosed herein, the present invention also includes pharmaceutical compositions containing at least one compound of the present invention in combination or admixture with a solid or liquid diluent or carrier, as well as methods of treating bacterial infections. The present invention also includes unit dosage forms comprising at least one compound of the present invention either alone or in admixture or combination with a solid or liquid diluent or carrier. The compound may be suitably enveloped by a protective covering containing the compound itself and, if used, a diluent or carrier.

The term "medicament in dosage unit form" as used in the present specification means a medicament as defined above in the form of discrete portions each containing a unit dose, or a multiple or sub-multiple of a unit dose of the active compound or compounds. Such portions may, for example, be in monolithic coherent form, such as tablets, suppositories, pills or dragées; in wrapped or concealed form, such as wrapped powders, cachets, sachets, or capsules; in ampoules, either free or as a sterile solution suitable for parenteral injection; or in any other form known to the art.

What is claimed is:

1. A compound of the formula (I)

wherein:

$R_1$ is hydrogen, lower alkyl, lower alkoxy or chlorine, and $$-N\diagup_{R_3}^{R_2}$$

is
N,N-dilower alkyl;
N,N-di-hydroxy-lower alkyl;
N-lower alkyl-N-hydroxy-lower alkyl; or
N-hydroxy-lower alkyl.

2. A compound of the formula wherein $$-N\diagup_{R_3}^{R_2}$$

is a member selected from the group consisting of $-NH-CH_3$
$-NH-C_3H_7$
$-NH-CH\diagup_{CH_3}^{CH_3}$
$-NH-C_4H_9$
$-NH-C(CH_3)_3$
$-NH-CH_2-CH_2-OH$
$-NH-CH_2-CH_2-OCH_3$
$-NH-(CH_2)_3-OCH_3$
$-NH-CH_2-CH_2-N\bigcirc N-H$
$-N\diagup_{CH_3}^{CH_3}$
$-N\diagup_{C_2H_5}^{C_2H_5}$
$-N\bigcirc H\ O$
$-N\bigcirc H\ N-CH_2-CH_2-OH$
$-NH-(CH_2)_2-OCH_3$
$-NH-(CH_2)_2-OCH_3$
$-NH-(CH_2)_2-OCH_3$
$-NH-CH_3$, and
$-NH-(CH_2)_3-N(CH_3)_2$ 3. The compound according to claim 2 which is:

4. The compound according to claim 2 which is:

5. The compound according to claim 2 which is:

6. The compound according to claim 2 which is:

7. The compound according to claim 2 which is:

8. The compound according to claim 2 which is:

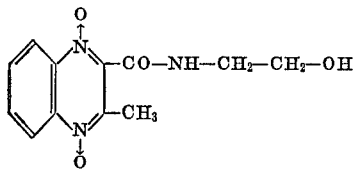

9. The compound according to claim 2 which is:

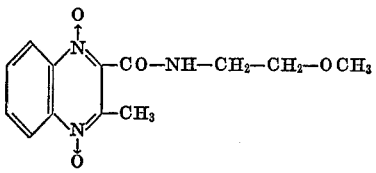

10. The compound according to claim 2 which is:

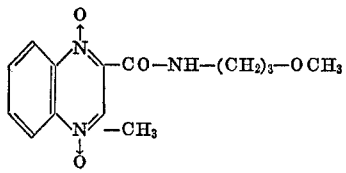

11. The compound according to claim 2 which is:

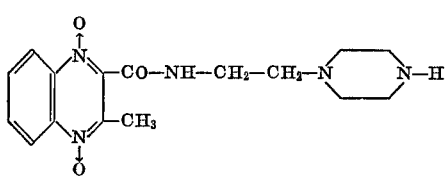

12. The compound according to claim 2 which is:

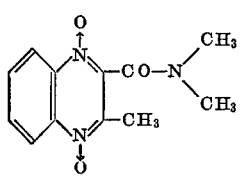

13. The compound according to claim 2 which is:

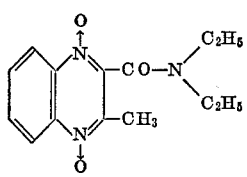

14. The compound according to claim 2 which is:

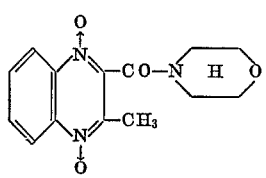

15. The compound according to claim 2 which is:

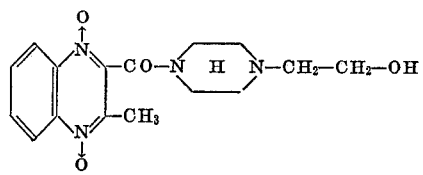

16. The compound according to claim 2 which is:

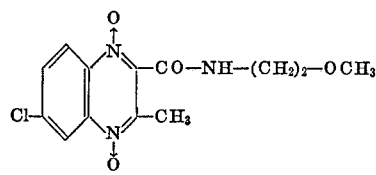

17. The compound according to claim 2 which is:

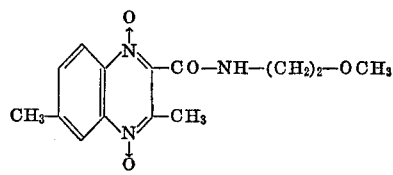

18. The compound according to claim 2 which is:

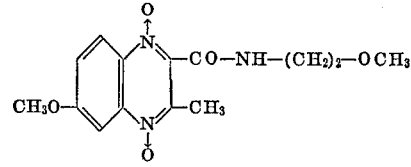

19. The compound according to claim 2 which is:

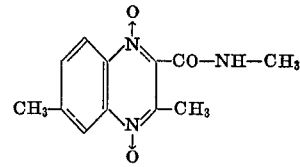

20. The compound according to claim 2 which is:

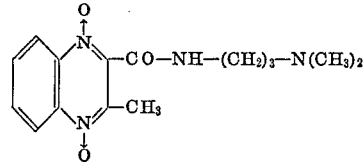

References Cited

UNITED STATES PATENTS 3,398,141  8/1968  Haddadin et al. _____ 260—250

OTHER REFERENCES

Chemical Abstracts, vol. 64, p. 11228 (1966).

NICHOLAS S. RIZZO, Primary Examiner

U.S. Cl. X.R.

260—250 R, 268 H; 424—248, 250

PO-1050
(5/69)

UNITED STATES PATENT OFFICE
CERTIFICATE OF CORRECTION

Patent No. 3,660,391           Dated May 2, 1972

Inventor(s) KURT LEY et al.

It is certified that error appears in the above-identified patent and that said Letters Patent are hereby corrected as shown below:

Col. 1, line 3, in the title "OZIDES" should be --OXIDES--; col. 2, line 13, "branch chained" should --branched chain--; col. 4, line 31, "sutsbance" should be --substance--; column 5, line 13, "on" should be --in--; column 9, line 55, "$C_{11}H_{22}N_3O_3$" should be --$C_{11}H_{11}N_3O_3$--; column 10, line 5, in the last column under the heading "Appearance" "pink crys" should be --pink crystals--; col. 12, lines 30-32 cancel in their entireties.

Signed and sealed this 28th day of November 1972.

(SEAL)
Attest:

EDWARD M. FLETCHER, JR.
Attesting Officer

ROBERT GOTTSCHALK
Commissioner of Patents